(12) United States Patent
Gayrard et al.

(10) Patent No.: US 11,506,624 B2
(45) Date of Patent: Nov. 22, 2022

(54) CAPACITIVE GAS SENSORS AND MANUFACTURING METHOD THEREOF

(71) Applicant: MEAS France SAS, Toulouse (FR)

(72) Inventors: Fabien Gayrard, Toulouse (FR); Thierry Philippi, Lombez (FR); Christelle Gleize, Tournefeuille (FR)

(73) Assignee: TE CONNECTIVITY SENSORS FRANCE, Toulouse (FR)

(*) Notice: Subject to any disclaimer, the term of this patent is extended or adjusted under 35 U.S.C. 154(b) by 422 days.

(21) Appl. No.: 16/513,646

(22) Filed: Jul. 16, 2019

(65) Prior Publication Data
US 2020/0025704 A1 Jan. 23, 2020

(30) Foreign Application Priority Data
Jul. 20, 2018 (EP) .................................... 18305995

(51) Int. Cl.
*G01N 27/22* (2006.01)
(52) U.S. Cl.
CPC .................................. *G01N 27/225* (2013.01)
(58) Field of Classification Search
CPC ........... G01N 2027/222; G01N 27/221; G01N 27/225
See application file for complete search history.

(56) References Cited

U.S. PATENT DOCUMENTS

| | | | |
|---|---|---|---|
| 5,767,687 A * | 6/1998 | Geist | G01N 27/221 324/663 |
| 6,450,026 B1 | 9/2002 | Desamaud | |
| 6,490,144 B1 * | 12/2002 | Narendrnath | H01L 21/67098 361/234 |
| 8,099,707 B1 * | 1/2012 | Li | H01L 27/0207 716/139 |
| 8,835,180 B2 * | 9/2014 | Gryska | G01N 27/221 436/149 |
| 2009/0134026 A1 * | 5/2009 | Langenbacher | G01N 27/225 204/424 |
| 2014/0197500 A1 | 7/2014 | Guillemet et al. | |
| 2016/0377569 A1 * | 12/2016 | Rajaraman | H04R 19/005 257/416 |

* cited by examiner

*Primary Examiner* — Nimeshkumar D Patel
*Assistant Examiner* — Jean F Morello

(57) ABSTRACT

The present invention provides capacitive gas sensor and manufacturing method thereof in which the capacitive gas sensor comprises: a first electrode; a second electrode; a gas-sensitive dielectric material arranged between the first and the second electrodes to form a gas sensitive capacitor, the gas-sensitive dielectric material has a permittivity that depends on an amount of a gas compound absorbed from the environmental medium; and a dielectric-electrode interfacing material arranged at an interface between the gas-sensitive dielectric material and at least one of the first and second electrodes. The dielectric-electrode interfacing material is adapted to absorb thermally-induced dilatation of the at least one of the first and second electrodes for reducing mechanical stress on the gas-sensitive dielectric material.

15 Claims, 3 Drawing Sheets

CAPACITIVE GAS SENSORS AND MANUFACTURING METHOD THEREOF

CROSS-REFERENCE TO RELATED PATENT APPLICATION

This patent application claims the benefit of European Patent Application No. 18305995.5 filed on Jul. 20, 2018, which patent application is hereby incorporated by reference in its entirety.

FIELD

The present invention relates generally to capacitive gas sensors for detecting and/or measuring the concentration of a gas compound in an environmental medium, such as relative humidity. More specifically, the present invention relates to capacitive gas sensors having a design that provides a fast sensor response and which is less affected by any thermal stress, especially thermal stress from manufacturing processes used in semiconductor technology, such as reflow assembly processes.

BACKGROUND

Capacitive gas sensors, such as humidity sensors, find applications in a wide range of technological fields, such as engine control, HVAC (heating, ventilation, and air conditioning), refrigerators, and medical applications, as well as in chemical, automobile and food industry, that require detection or control of a gas compound in an environmental medium. The basic working principle lies in measuring across a number of electrodes the capacitance of a gas-sensitive dielectric material having a permittivity that changes with the amount of absorbed gas and/or humidity. The measurement of the sensor capacitance then provides an indication of the gas concentration in the surrounding medium. In order to obtain accurate as well as stable measurements of gas concentration, the gas-sensitive dielectric material should then exhibit ideal characteristics, such as a short response time to variations in gas concentration (for example, less than 10 seconds), a linear response to the gas concentration and low hysteresis. The choice of the most suitable gas-sensitive dielectric and electrode design for the gas sensor depends on the application for which the capacitive gas sensor is intended, which may imply compromising sensor parameters that are not critical to the specific application. Thus, different designs of capacitive gas sensors are available.

For instance, U.S. Pat. No. 6,450,026 describes a conventional design of a capacitive sensor for measuring humidity. This sensor comprises two electrodes separated by a dielectric material that absorbs humidity. One of the electrodes is made of non-metallic porous material, for allowing the passage of humidity through the electrode, which is made conductive by the inclusion of electrically conducting particles. The other electrode is produced by using a non-porous metal sheet. The dielectric material is provided in the form of a multilayer polymer film for allowing better control of the final thickness, and consequently, of the sensor precision.

Integrated capacitive sensor designs have also been proposed, such as described in publication US 2014/0197500 A1. The integrated capacitive sensor includes a bottom electrode layer and a landing pad formed on a portion of a passivation layer located over an application-specific integrated circuit (ASIC), a gas sensitive layer formed onto the bottom electrode layer and the landing pad, a via through the gas sensitive layer to expose a portion of the landing pad, and a top electrode layer formed onto the gas sensitive layer. The top electrode layer completely overlays a surface area of the bottom electrode layer and a portion thereof is deposited into a via hole for forming an electrical connection between the top electrode layer and the landing pad. The top electrode is made of a porous conductive polymer and a polyimide is used for the gas sensitive layer.

Organic materials, such as polymers, are commonly used as gas-sensitive dielectric material due to their advantages in terms of response linearity and low hysteresis. In particular, polyimides provide a great facility in adsorbing the retained gas (or humidity) in response to a decrease in relative humidity and a high heat resistance. However, polyimides present certain disadvantages, such as low sensitivity to humidity values below 5% RH and very long stabilization times.

Sulfone-based polymers are also employed in capacitive gas sensors due to their advantage of providing faster response times than polyimides. However, it was noticed that capacitive humidity sensors using sulfone-based polymers for the gas-sensitive dielectric exhibit an undesirable positive shift in relative humidity (RH) measurements after the sensor undergoes a reflow assembly process, during which there is a significant increase of temperature. Specifications requirements for humidity sensors are typically of +/−3% RH.

FIG. 1 represents schematically a cross-sectional side view of a conventional integrated capacitive gas sensor 100 for which a shift in the % RH response was identified. The capacitive gas sensor 100 includes a porous top electrode 110, a bottom electrode 120 directly formed on a substrate 130 including an ASIC (not shown), and a gas-sensitive polymer dielectric 140 between the top electrode 110 and the bottom electrode 120. The bottom electrode 120 is made of a noble metal, such as gold with a thickness of approximately 80 nm. A thin polyimide adhesion layer 170 (for e.g. of about 80 nm) may be formed on the bottom electrode 120 for promoting adhesion of the polymer dielectric. The polymer dielectric 140 of a sulfone-based polymer may have a thickness of about 2.7 µm. The porous top electrode 110 is made of an organic polymer (doped with conductive particles) and has a thickness within the range between 10 to 30 µm. The porous top electrode 110 is connected to active circuitry in the substrate 130 through a via 160 across the gas-sensitive polymer dielectric 140 and the adhesion layer 170.

In this type of sensor design, a response shift of about +6% RH was measured after a typical reflow soldering process including a thermal cycle with a peak temperature of 250° C. during 30 seconds. Such a response shift falls outside specifications requirements for humidity sensors. Further, although the humidity sensor is able to recover the original response after a certain time, typical recovery times are of about 30 days, which are too long for meeting customers' requirements.

Polyimides are less sensitive to reflow processes, although an undesired negative shift of relative humidity % RH was also identified in gas sensors using polyimide as the gas-sensitive dielectric. Nevertheless, polyimides have a response time of about three times slower than sulfone-based polymers, which renders them less interesting for applications that require a faster sensor response.

Consequently, there is still a need for capacitive gas sensor designs providing a sensor response that is fast, or at least comparable to the response times achieved with sulfone-based polymers, and that is less affected by thermal processes commonly used in semiconductor technology, such as reflow assembly processes.

SUMMARY

The present invention has been made in view of the shortcomings and disadvantages of the prior art, and an object thereof is to provide capacitive gas sensor capable of providing a fast response time and with a design that makes the capacitive sensor responsivity less sensitive to thermal processes, such as reflow assembly processes conventionally used in semiconductor technology, and a method of manufacturing the same.

According to an embodiment of the present invention, it is provided a capacitive gas sensor, comprising: a first electrode; a second electrode; a gas-sensitive dielectric material arranged between the first and the second electrodes to form a gas sensitive capacitor, the gas-sensitive dielectric material having a permittivity that depends on an amount of gas compound absorbed from an environmental medium; and a dielectric-electrode interfacing material arranged at an interface between the gas-sensitive dielectric material and at least one of the first and second electrodes, the dielectric-electrode interfacing material being adapted to absorb thermally-induced dilatation of the at least one of the first and second electrodes for reducing the mechanical stress applied on the gas-sensitive dielectric material.

According to an embodiment of the present invention, the gas-sensitive dielectric material comprises a gas-sensitive polymer, and the dielectric-electrode interfacing material is permeable to the gas compound and/or comprises a polymer having a glass temperature higher than the glass temperature of the gas-sensitive dielectric material.

According to an embodiment of the present invention, the gas-sensitive dielectric material comprises one or more layers of a sulfone-based polymer of a group comprising: polysulfone, polyethersulfone and polyphenylsulfone, and any combination thereof; and/or the gas-sensitive dielectric material comprises one or more layers of a polymer of a group comprising: cellulose acetate butyrate, polyamide-imide, polyetherimide, and polyamide, and/or any combinations thereof or a similar polymer material sensitive to gas.

According to an embodiment of the present invention, the gas-sensitive dielectric material is a sulfone-based polymer material; and the dielectric-electrode interfacing material is a polyimide material or any polymer material having a glass temperature higher than the glass temperature of the gas-sensitive dielectric material.

According to an embodiment of the present invention, the gas-sensitive dielectric material comprises a polymer material from an additived polymer grade, the polymers of the additived polymer grade including a cross-linking additive adapted to pin the chains of the polymer material for increasing the resistance to a change of chain orientation under thermally-induced mechanical stress from the at least one of the first and second electrodes.

According to an embodiment of the present invention, at least one of the first and second electrodes have a porous structure adapted to pass through the gas compound.

According to an embodiment of the present invention, at least one of the first and second electrodes is made of a porous polymer material doped with electrically conducting particles, a thickness and/or a degree of porosity of the porous polymer material being selected to reduce thermal dilatation of the respective electrode at temperatures close to a temperature at which the structure of the gas-sensitive dielectric material is softened so as to reduce the mechanical stress applied on the gas-sensitive dielectric material.

According to an embodiment of the present invention, the first electrode is formed on a top side of the gas-sensitive dielectric material that absorbs the gas compound from the environment, the second electrode is formed on a side of the gas-sensitive dielectric material opposed to the top side, and the dielectric-electrode interfacing material being formed directly on said top side of the gas-sensitive dielectric material to separate it from the first electrode.

According to an embodiment of the present invention, the capacitive gas sensor is integrated in a semiconductor circuit substrate, the second electrode being arranged directly on the semiconductor circuit substrate, the first electrode being connected to a patch in the semiconductor circuit substrate through a via that passes across the dielectric-electrode interfacing material and the gas-sensitive dielectric material.

According to an embodiment of the present invention, at least one of the first electrode, the dielectric-electrode interfacing material, and the gas-sensitive dielectric material have a perforated structure comprising one or more perforations to facilitate absorption and/or adsorption of the gas compound by the gas-sensitive dielectric material.

According to an embodiment of the present invention, the first electrode comprises one or more first electrode islands electrically connected to each other to act as a single electrode, the second electrode is provided as one or more second electrode islands electrically connected to each other to act as a single electrode, the first electrode islands being intercalated with the second electrode islands to form an interdigitated electrode structure, the gas-sensitive dielectric material lying in-between adjacent electrode islands, the dielectric-electrode interfacing material being formed between the gas-sensitive dielectric material and each electrode island.

According to the present invention, it is provided a capacitive gas sensor, comprising: a first electrode; a second electrode; and a gas-sensitive dielectric material arranged between the first and the second electrodes to form a gas sensitive capacitor, the gas-sensitive dielectric material being adapted to absorb a gas compound from an environmental medium and has a permittivity that depends on an amount of absorbed gas compound. The gas-sensitive dielectric material comprises a polymer material from an additived polymer grade, the polymers of the additived polymer grade including a cross-linking additive adapted to pin the chains of the polymer material for increasing the resistance to a change of chain orientation under thermally-induced mechanical stress from the at least one of the first and second electrodes.

According to the present invention, it is provided a capacitive gas sensor, comprising: a first electrode; a second electrode; and a gas-sensitive dielectric material arranged between the first and the second electrodes to form a gas sensitive capacitance, the gas-sensitive dielectric material being adapted to absorb a gas compound from the environment and has a permittivity that depends on the amount of absorbed gas retained within the gas-sensitive dielectric material; wherein at least one of the first and second electrodes is made of a porous polymer material doped with electrically conducting particles, a thickness and/or a degree of porosity of the porous polymer material being selected to reduce thermal dilatation of the respective electrode at temperatures close to a temperature at which the structure of the gas-sensitive dielectric material starts to soften so as to reduce the mechanical stress applied on the gas-sensitive dielectric material.

The present invention also provides a method of manufacturing a capacitive gas sensor having a first electrode, a second electrode, and a gas-sensitive dielectric material arranged between the first and the second electrodes, the gas-sensitive dielectric material having a permittivity that depends on an amount of gas compound absorbed from an environmental medium, the method comprising: providing the second electrode; forming the gas-sensitive dielectric material onto the second electrode; depositing a dielectric-electrode interfacing material to cover an area of the gas-sensitive dielectric material; and depositing the first electrode onto said area covered by the dielectric-electrode interfacing material; wherein the dielectric-electrode interfacing material is selected as a dielectric polymer material adapted to absorb thermally-induced dilatation of the at least one of the first and second electrodes for reducing the mechanical stress applied on the gas-sensitive dielectric material.

The present invention also provides a method of manufacturing a capacitive gas sensor having a first electrode, a second electrode, and a gas-sensitive dielectric material arranged between the first and the second electrodes, the gas-sensitive dielectric material having a permittivity that depends on an amount of gas compound absorbed from an environmental medium, the method comprising: providing the second electrode; forming the gas-sensitive dielectric material onto the second electrode; forming the first electrode onto said area covered by the dielectric-electrode interfacing material; wherein the first electrode, the second electrode, and/or the gas-sensitive dielectric material are designed to minimize the mechanical stress applied by the first and/or second electrodes at the interface with the gas-sensitive dielectric material in that: a polymer material from an additived polymer grade is used to form the gas-sensitive dielectric material, the polymers of the additived polymer grade including a cross linking additive adapted to pin the chains of the polymer material for increasing the resistance to a change of chain orientation under thermally-induced mechanical stress from the at least one of the first and second electrodes; and/or at least one of the first and second electrodes are made of porous polymer materials doped with electrically conducting particles, a thickness and/or a degree of porosity of the porous polymer material being selected to reduce thermal dilatation of the respective electrode at temperatures close to a temperature at which the structure of the gas-sensitive dielectric material is softened.

The accompanying drawings are incorporated into and form a part of the specification for the purpose of explaining the principles of the invention. The drawings are not to be construed as limiting the invention to only the illustrated and described examples of how the invention can be made and used.

BRIEF DESCRIPTION OF THE DRAWINGS

Further features and advantages will become apparent from the following and more detailed description of the invention as illustrated in the accompanying drawings, in which.

DETAILED DESCRIPTION

The present invention will now be more fully described hereinafter with reference to the accompanying drawings, in which exemplary embodiments of the invention are shown. The present invention may, however, be embodied in many different forms and should not be construed as limited to the embodiments set forth herein. Rather, these embodiments are provided so that the disclosure will be thorough and complete, and will fully convey the scope of the invention to those skilled in the art. Like numbers refer to like elements throughout. In the Figures, the sensor capacitance between electrodes is symbolically represented with a capacitance symbol.

Figure 1:
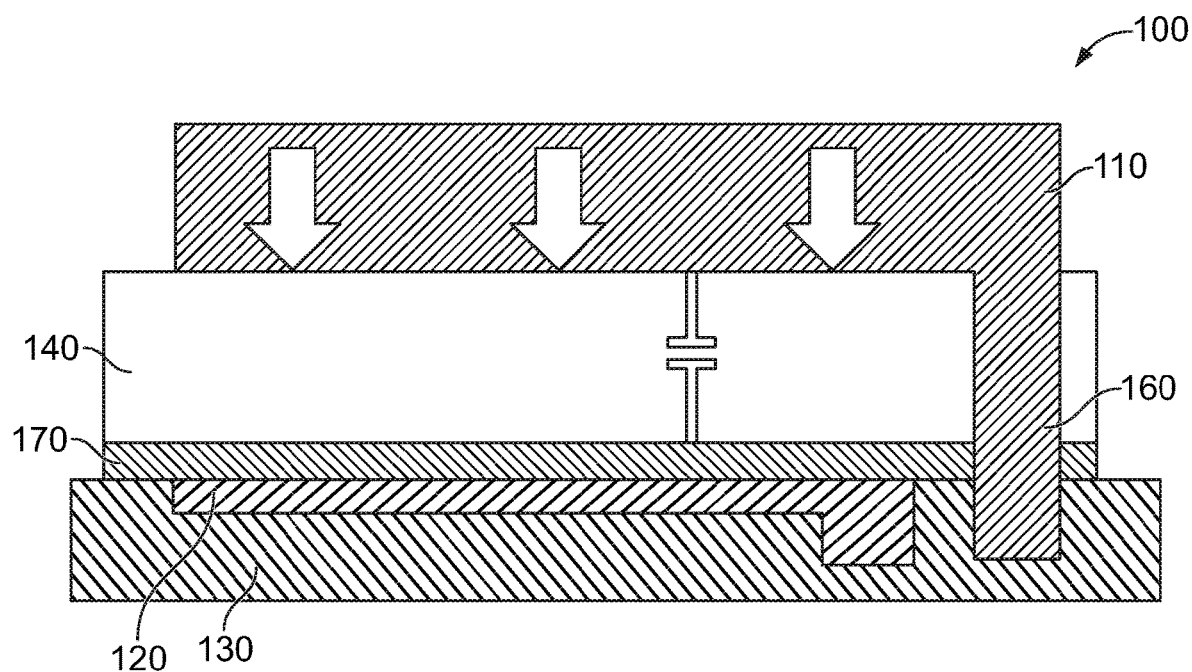
FIG. 1 is a schematic cross-sectional side view of a conventional capacitive gas sensor.

As it will be explained with reference to FIG. 1, the undesirable shift measured after the capacitive humidity sensor undergoes a reflow process can be explained by an increase in permittivity of its gas-sensitive polymer dielectric.

The increase of permittivity is caused by the combination of mechanical constraints from the porous top electrode and the softening of the gas-sensitive polymer dielectric when the temperature increases to temperatures close to the glass temperature of the polymer dielectric. During a thermal process, such as reflow, the increase of temperature may induce a thermal dilatation of the porous top electrode 110, which results in additional mechanical stress being transferred to the first layers of the polymer dielectric 140 through the interface between the porous top electrode 110 and the polymer dielectric 140. On the other hand, the structure of the polymer dielectric 140 is softened at temperatures close to its glass temperature. As a result, the polymer chains can rearrange or change orientation under the thermally-induced mechanical stress from the top electrode 110. This rearrangement will be then reflected in a temporary change of the polymer permittivity, thereby modifying the sensor response. The effect of permittivity increase is more pronounced in gas sensors based on sulfone-based polymers due to their glass temperatures being close to or below peak reflow temperatures reached during conventional reflow processes.

According to an aspect of the present invention, the sensitivity of the capacitive gas sensor to reflow can be significantly reduced or even prevented by forming or depositing a protection material at the interface between the gas-sensitive dielectric and the capacitive sensor electrode (s) that protects the gas sensitive dielectric from mechanical stress. This mechanical-stress protective material will be interchangeably referred to hereinafter as dielectric-electrode interfacing material or simply as dielectric-protective material since it protects the gas sensitive dielectric material from changing its dielectric permittivity due to the mechanical stress applied by the sensor electrodes across their interface with the gas sensitive dielectric.

Figure 2:
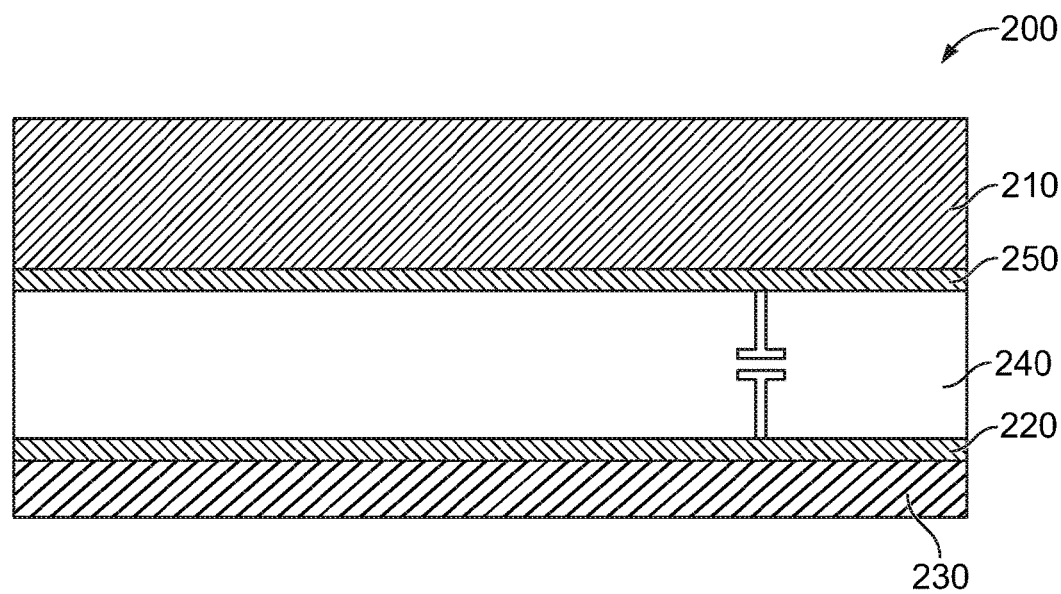
FIG. 2 is a schematic cross-sectional side view of an illustrative capacitive gas sensor in accordance with a first configuration.

FIG. 2 represents schematically a cross-section of a capacitive gas sensor 200 according to a stacked electrode design. The capacitive gas sensor 200 comprises a first electrode 210, a second electrode 220 formed on a substrate 230, and a gas sensitive dielectric material 240 placed between the first and second electrodes 210 and 220. A dielectric-protective material 250, also called dielectric-electrode interfacing material, is formed at the interface between the gas sensitive dielectric layer 240 and the top electrode 210 for preventing the effects of mechanical stress thereon. The substrate 230 may be also an electrode, a metal substrate being then used for such a purpose, and the layer 220 may be a protective material that protects the gas-sensitive dielectric material 240 from the thermal stress induced by the metallic substrate electrode 230.

The first and second electrodes 210 and 220 are planar electrodes, vertically stacked in a direction transverse to the substrate 230. The top electrode 210 is preferably a porous electrode for allowing the gas compound to be detected to pass through and reach the underlying gas sensitive layer 240. The top electrode 210 may be made of a porous polymer, which is made conductive by the inclusion of electrically conducting particles. The thickness of the porous top electrode 210 preferably lies in the range between 10 to 30 μm.

The gas sensitive dielectric material 240 may include any electrically insulating material that is capable of absorbing gas from the environmental medium and having a permittivity that changes with the amount of gas retained within the gas sensitive dielectric. The gas sensitive dielectric material 240 is preferably formed of, or comprise, a sulfone-based dielectric material since this is among the organic materials that provide a faster responsivity to changes in gas concentration. Examples of sulfone-based dielectrics that may be used (or most preferred) for the gas sensitive dielectric material include one selected from the group comprising; polysulfone (PSU), polyethersulfone (PES) and polyphenylsulfone (PPSU), and any combination thereof. Alternatively, or in addition, the gas sensitive dielectric material may be made of, or comprise, an organic polymer such as one selected from the group including; cellulose acetate butyrate (CAB), polyamide-imide (PAI), polyetherimide (PEI), and polyamide (PA), and any combination thereof.

The dielectric-protective material 250 is preferably deposited at the interface between the gas sensitive dielectric layer 240 and the top electrode 210 for preventing the effects of thermally-induced mechanical stress onto the gas sensitive dielectric 240. The dielectric-protective material 250 is preferably made of a non-conductive material, such as a polymer having a glass temperature $T_g$ higher than the peak temperatures reached during reflow (for e.g. 250° C.), and/or the glass temperature of the gas sensitive dielectric material itself. In addition, depending on the electrode design of the gas sensor and relative arrangement of the dielectric-protective material, the dielectric material(s) selected for the dielectric-protective layer may be permeable to the gas compound (e.g. moisture) so as to allow it to reach the gas-sensitive material.

Polyimide is a suitable material for the dielectric-protective layer, namely, when a sulfone-based dielectric material is used for the gas-sensitive material, due to its high heat resistance and a glass temperature of about 320° C., which is higher than the glass temperature of sulfone-based dielectrics and conventional reflow temperatures. Moreover, since polyimides are often employed in the semiconductor industry as a high-temperature adhesive layer, the formation of one or more interface layers of polyimides can be easily integrated into the manufacturing process of the capacitive gas sensor. The dielectric-protective layer 250 is preferably applied as a layer sufficiently thin such as not to contribute itself to the gas sensor capacitance and not to decrease response time but should be sufficiently large to counteract the effect of the electrodes thermal dilatation over the gas sensitive dielectric material. For instance, a suitable thickness for a dielectric-protective material of polyimide lies between 80 to 150 nm.

The gas sensitive dielectric material 240 may also be provided with a multi-layered dielectric structure formed with multiple layers of one or more of the gas-sensitive polymers mentioned above. In this case, a dielectric-protective layer 250 may be provided between each gas-sensitive layer of the multi-layered structure for reducing the transmission of mechanical stress across the multi-layered dielectric structure.

In the configuration shown in FIG. 2, the dielectric-protective layer 250 is formed in direct contact with the underlying gas sensitive dielectric layer 240. On the other hand, other functional layers may be provided between the dielectric-protective layer 250 and the top electrode 210, depending on the need and application. For instance, in case the top electrode 210 is made of a conductive material prone to oxidation, an anti-oxidation layer may be arranged between the top electrode 210 and the dielectric-protective layer 250 for protecting the top electrode 210 against oxidation caused by the gas/humidity retained in the underlying gas sensitive dielectric layer 240.

The bottom electrode 220 can be made of an electrically conductive material, preferably a non-porous metal conductor, such as gold. In this case, the mechanical stress applied by the bottom electrode 220 over the gas sensitive dielectric layer 240 is also present although less consequent in comparison with the top electrode 210, and consequently, a dielectric-protective layer between the bottom electrode 220 and the gas sensitive dielectric layer 240 may not be added. Nevertheless, in order to provide a more performant solution, an additional dielectric-protective layer between the bottom electrode 220 and the gas sensitive dielectric layer 240 may be provided (not shown). The characteristics of this additional dielectric-protective layer, such as the type of polymer material and/or layer thickness to be used, may be similar to those of the dielectric-protective layer 250 described above. Alternatively, the additional dielectric-protective layer may be optimized based on the characteristics of the bottom electrode 220, such as the strength of the thermal stress onto the dielectric-protective layer 250, so as to reduce the overall thickness of the dielectric-protective layers and their contribution to the gas sensor capacitance and/or response time to a minimum. In a further configuration, the bottom electrode 220 may be made of a porous material, such as the top electrode 210, e.g., to allow gas absorption from both sides of the capacitor gas sensor. In this case, the substrate 230 may be omitted and an additional dielectric-protective layer (not shown) similar to the dielectric-protective layer 250 may be provided at the interface between the bottom electrode 220 and the gas sensitive dielectric material 240.

The thickness of the dielectric-protective material 250 may be empirically selected, depending on the sensor parameters, such as to effectively protect the gas sensitive dielectric 240 against permittivity changes caused by thermally-induced mechanical stress from the first electrode 210 and/or the second electrode 220.

The first and second electrodes 210 and 220 are depicted in FIG. 2 as single electrodes that extend over an area of the gas sensitive dielectric layer 240. However, each of the first electrode 210 and second electrode 220 may be provided as a plurality of electrically interconnected electrode islands.

The protective effect of the dielectric-protective layer 250 described above is also applicable to capacitive gas sensor configurations other than illustrated in FIG. 2, as it will be described below with reference to FIGS. 3 to 6.

Figure 3:
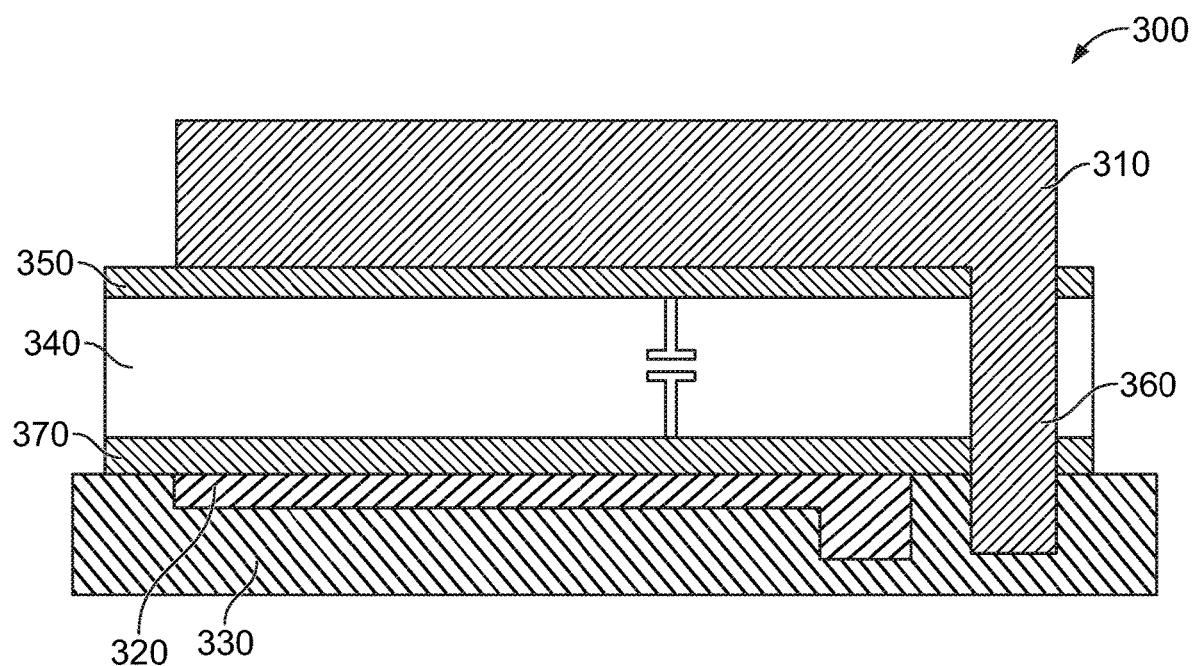
FIG. 3 is a schematic cross-sectional side view of an illustrative integrated capacitive gas sensor in accordance with a second configuration.

FIG. 3 depicts schematically a configuration of an integrated capacitive gas sensor 300 having a dielectric-protective layer according to the principles of the present invention. Similarly, to the configuration described with reference to FIG. 1, the capacitive gas sensor 300 comprises a first electrode 310, a second electrode 320 that is integrated on a semiconductor circuit substrate 330, and a gas sensitive dielectric layer 340 formed between the first and second electrodes 310 and 320. The underlying substrate 330 comprises active circuitry (or AISC) and respective conducting lines and patches for electrically connecting to the first and second electrodes 310 and 320 and measure the capacitance of the gas sensor 300. The top electrode 310 is electrically connected to the conducting patches in the substrate 330 through a via 360. Similarly, to the capacitive gas sensor 100 described with reference to FIG. 1, the top electrode 310 may be made of a non-porous polymer made conductive by the inclusion of electrically conducting particles and the bottom electrode 320 formed of a noble metal, such as gold.

In the integrated sensor configuration shown in FIG. 3, the thermally-induced mechanical stress comes mainly from the porous top electrode 310. Consequently, the mechanical pressure applied on the underlying gas sensitive dielectric material 340 may be reduced and/or canceled by forming an intermediate dielectric-protective material 350 at the interface between the top electrode 310 and the gas sensitive dielectric layer 340. In general, the gas sensitive dielectric layer 340 and the dielectric-protective material 350 may be formed of any of the materials described above for the gas sensitive dielectric layer 240 and the dielectric-protective material 250, respectively, and therefore, the details will not be repeated here. However, the characteristics of the gas sensitive dielectric layer 340 and dielectric-protective material 350, including thickness and selected materials, depend on the requirements for the particular integrated gas sensor, namely, manufacturing requirements such as temperatures to which it will be submitted, and the specific sensor application.

The integrated capacitive gas sensor 300 may also include a thin adhesion layer 370 formed above the patterned substrate 330 and the bottom electrode 320 for increasing the adhesion of the gas sensitive dielectric material 340. A thickness of about 80 nm for an adhesion layer made of polyimide will be sufficient for reducing the effects of thermally-induced mechanical stress from the bottom electrode 320, either if it is a metal electrode or a porous polymer electrode. Thus, in a capacitive sensor configuration having a bottom electrode 320 with characteristics similar to the porous top electrode 310, a layer of dielectric-protective material with a thickness in the range from 80 to 150 nm may be provided at the interface between the gas sensitive dielectric layer 340 and the bottom electrode 320 for reducing the effects of mechanical stress thereon, in addition to or instead of the adhesion layer 370. In this case, the dielectric-protective material also provides the function of the adhesion layer 370.

Similarly, to the capacitive gas sensor 200 described with reference to FIG. 2, the gas capacitive sensor 300 may be manufactured on a substrate wafer using processes known in the semiconductor industry and will not be detailed here.

Figure 4:
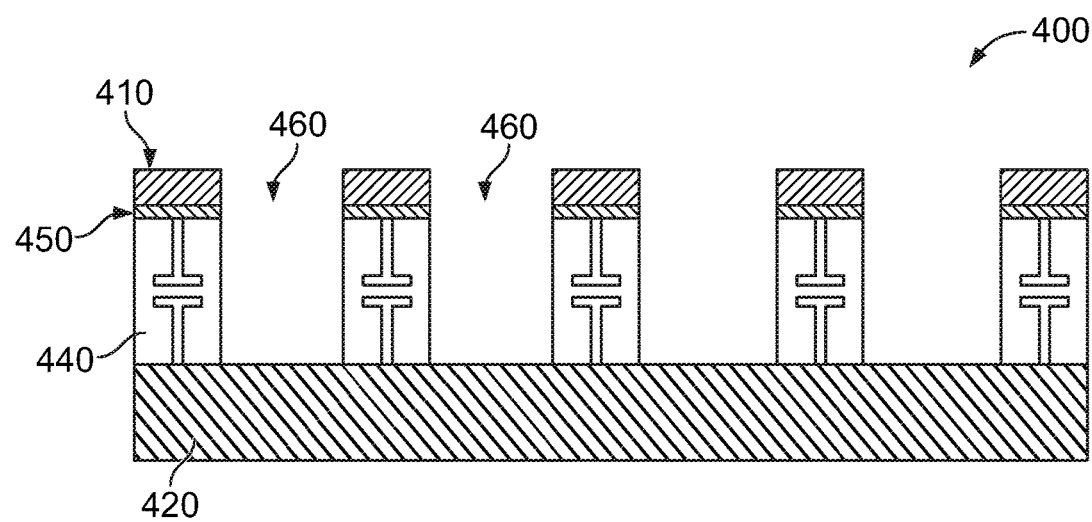
FIG. 4 is a schematic cross-sectional side view of an illustrative capacitive gas sensor with a perforated structure in accordance with a third configuration.

FIG. 4 depicts a capacitive gas sensor 400 with a perforated structure design and to which principles of the present invention are also advantageously applied. Similarly, to the capacitive gas sensor 200 described with reference to FIG. 2 above, the capacitive gas sensor 400 includes first and second electrodes 410 and 420 for measuring the capacitance of a gas sensitive dielectric material 440 placed between them. The second electrode 420, the gas sensitive dielectric material 440 and the first electrode 410 are vertically stacked in this order in a direction transverse to the planar surface of the second electrode 420. A dielectric-protective material 450 is provided at the interface between the top electrode 410 and the gas sensitive dielectric material 440 so as to protect the gas sensitive dielectric material 440 from the mechanical stress induced by the thermal dilatation of the top electrode 410.

The design of the capacitive gas sensor 400 differs from the design of FIG. 2 in that the first electrode 410, the protective interface layer 450 and the gas-sensitive dielectric material 440 are formed with a perforated structure for facilitating the absorption and/or adsorption of the compound gas by the gas-sensitive dielectric material 440. The perforated structure may be accomplished by patterning one or more perforations 460 in a direction transverse to the planar surface of the second electrode 420 using any known patterning processes in the field.

The gas sensitive dielectric material 440 and the dielectric-protective material 450 may be formed of any of the organic polymers described above for the gas sensitive dielectric material 240 and the dielectric-protective material 250, respectively. In a preferred configuration, the gas sensitive dielectric material 440 is a sulfone-based polymer and the dielectric-protective material 450 is a polyimide.

Similarly, to the examples described above, the top electrode 410 is preferably made of a porous non-conductive material, such as an organic polymer, for facilitating the absorption of gas/humidity by the gas sensitive dielectric material 440, and made conductive by doping with electrically conductive particles. Alternatively, the top electrode 410 may also be formed of a non-porous material, such as a metal, since the gas and/or humidity from the environment can directly reach the underlying gas sensitive dielectric material 440 through the perforated structure.

The second electrode 420 may be a continuous electrode, as illustrated in FIG. 4, or provided with a perforated structure similar to the gas sensitive dielectric material 440 and/or the first electrode 410. The bottom electrode 420 can be made of any electrically conductive material, preferably a non-porous metal conductor. In this case, the mechanical stress applied by the bottom electrode 420 over the gas sensitive dielectric layer 440 is less consequent in comparison with the porous top electrode 410 and consequently, a dielectric-protective layer between the bottom electrode 420 and the gas sensitive dielectric layer 440 may be omitted. In order to achieve a more performing solution, an additional dielectric-protective layer between the bottom electrode 420 and the gas sensitive dielectric material 440 may be nevertheless provided, similarly to the embodiment described above with reference to FIG. 2.

In an alternative configuration, the bottom electrode 420 may be a porous electrode, such as the top electrode 410. In such case, a dielectric-protective layer (not shown) may also be formed at the interface between the gas sensitive dielectric layer 440 and the bottom electrode 420 for preventing the effects of mechanical stress thereon.

In the capacitive gas sensor designs described with reference to FIGS. 2 to 4 above, the capacitive sensor electrodes are vertically stacked, with the respective protective interface and gas-sensitive material layers placed in-between. However, the principles of the present invention may also be applied to capacitive gas sensors having an interdigitated structure, such as the capacitive sensor 500 illustrated in FIGS. 5 and 6.

Interdigitated capacitive sensors may provide several advantages over capacitive gas sensors with stacked electrodes. For instance, the sensor capacitance is easily customized by adjusting the separation between interdigitated electrodes. However, lateral dilatation of the interdigitated electrodes due to temperature increase may also exert mechanical stress on the gas sensitive dielectric material between adjacent electrodes, and consequently, change permittivity in such a manner that the advantage of customizable sensor capacitance may be lost. This shortcoming may be avoided or minimized by applying a dielectric-protective material at the interface between each or a number of interdigitated electrodes and the gas sensitive dielectric material deposited between interdigitated electrodes.

Figure 5:
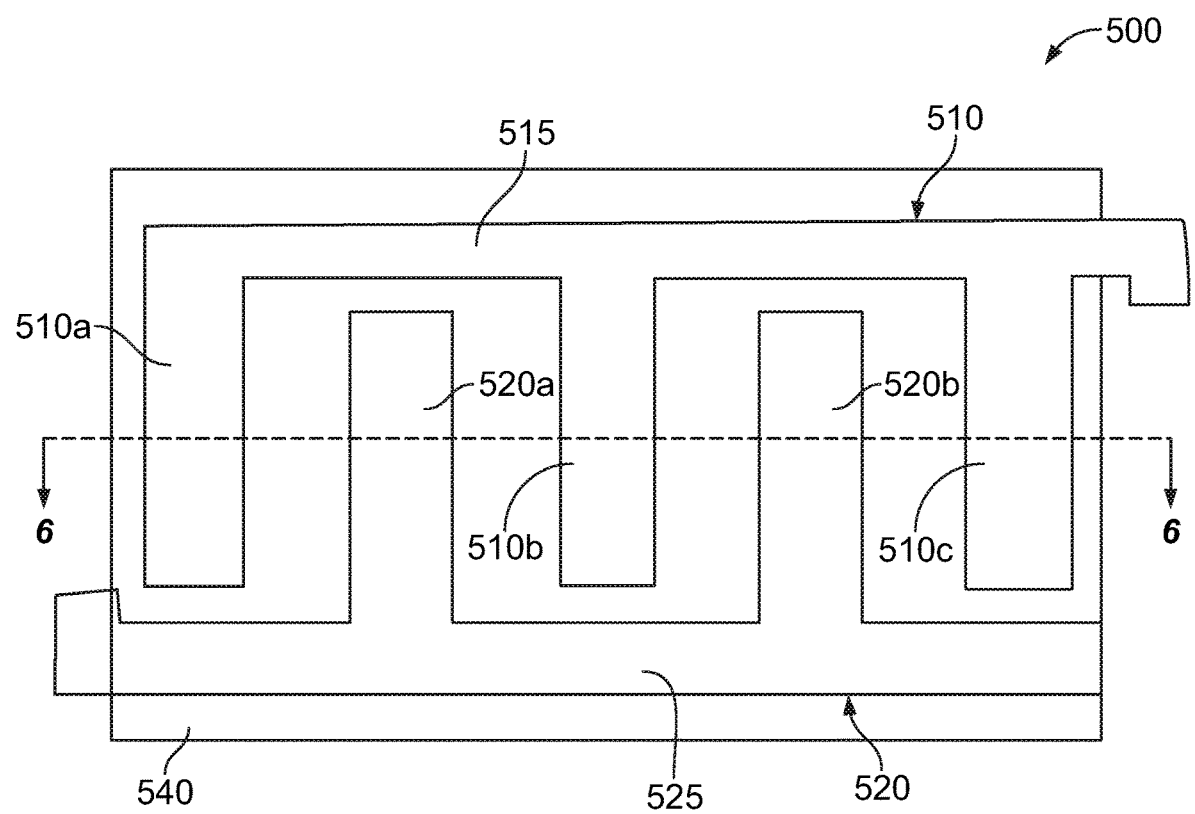
FIG. 5 is a schematic top side view of an illustrative capacitive gas sensor with an interdigitated electrode structure in accordance with a fourth configuration.
Figure 6:
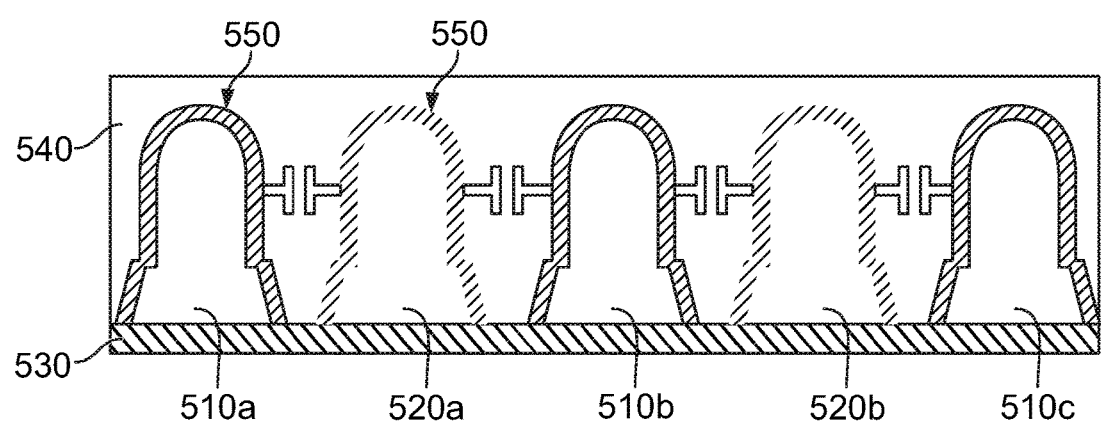
FIG. 6 is a schematic cross-sectional side view of the capacitive gas sensor depicted in FIG. 5, along the direction 6-6.

Referring to FIGS. 5 and 6, the capacitive gas sensor 500 comprises first and second electrodes 510 and 520 which are arranged side by side on top of a dielectric substrate 530, in a non-overlapping arrangement. Each of the first electrode 510 and the second electrode 520 comprises one or more electrode islands 510a-510c and 520a-520b, respectively. As illustrated in FIG. 5, each of the electrode islands 510a-510c and 520a-520b have the shape of a finger. The interdigitated structure is achieved by alternating each of the electrode islands 510a-510c of the first electrode 510 with an electrode island 520a-520b of the second electrode 520, such that each interdigitated electrode will be coupled to a polarity opposite to the polarity of the immediately adjacent interdigitated electrode. The electrode islands 510a-510c are connected to each other by an electrically conducting strip 515, thereby acting as a single electrode 510. Similarly, the electrode islands 520a-520b are connected to each other by a respective conducting strip 525, and consequently, also act as a single electrode 520. As shown in FIG. 6, the first and second electrodes 510 and 520 are arranged on a same plane of the capacitive gas sensor 500. However, sensor configurations in which the interdigitated electrodes are provided at different planes, in a non-overlapping manner, are also envisaged.

A gas-sensitive dielectric material 540 is formed in the space between each pair of neighboring interdigitated electrodes and may eventually cover the interdigitated electrodes for maximizing the gas absorbing surface of the sensor 500. The capacitance of the gas sensor 500 can be measured by measuring circuitry that is connected to the interdigitated electrodes, e.g., by electrical lines patterned on the underlying substrate 530 (not shown).

As illustrated in FIG. 6, a dielectric-protective material 550 is applied on the surfaces of the interdigitated electrodes 510 and 520 that interface with the gas-sensitive dielectric material 540 for reducing the mechanical stress applied by two adjacent interdigitated electrodes, for e.g. electrodes 510a and 520b, on the gas-sensitive dielectric material 540 deposited in-between. However, the dielectric-protective material 550 may be formed so as to cover the interdigitated electrodes 510a-510c and 520a-520b only partially, for e.g. on the lateral surfaces of the electrodes which should exert more mechanical stress on the gas-sensitive dielectric material than the top surface.

Any of the gas sensitive dielectric materials and dielectric-protective materials mentioned above with reference to FIGS. 2 to 4 may be used in the interdigitated capacitive gas sensor 500. Preferably, the gas sensitive dielectric material 540 is a sulfone-based polymer and the dielectric-protective material 550 is a polyimide. The dielectric-protective material 550 may be also applied on the substrate area between the interdigitated electrodes 510 and 520 since it is not electrically conductive, which simplifies the manufacturing process.

The first and second electrodes 510 and 520 may be made of a non-porous conducting material, such as a metal, because the interdigitated electrodes 510a-510c and 520a-520b do not cover the surface of gas-sensitive dielectric layer 540 through which environmental gas/moisture is absorbed. In this case, polyimide may be used for the dielectric-protective material. However, since polyimide is permeable to humidity, in order to protect the interdigitated electrodes 510a-510c and 520a-520b against oxidation from the moisture absorbed in the gas sensitive layer 540, a layer of non-oxidizing material (not shown), such as a noble metal or alternative passivation layer of, for e.g. silicon oxide or silicon nitride, may be applied between the interdigitated electrodes 510a-510c and 520a-520b and the dielectric-protective material 550. The dielectric-protective material 550 is then in direct contact with the gas sensitive dielectric layer 540 but not with the interdigitated electrodes 510a-510c and 520a-520b.

The capacitive gas sensors described above with reference to FIGS. 2 to 6 may be manufactured using methods that are conventionally used in the semiconductor industry, and therefore it will not be detailed here. For instance, the capacitive gas sensors illustrated in FIGS. 2 to 6 may be manufactured by a method comprising: providing the second electrode; forming the gas-sensitive dielectric material onto the second electrode; depositing a dielectric-protective material to cover an area of the gas-sensitive dielectric material; and depositing the first electrode onto said area covered by the dielectric-protective material.

The dielectric-protective material is then selected as a dielectric polymer material adapted to absorb thermally-induced dilatation of the at least one of the first and second electrodes for reducing the mechanical stress applied on the gas-sensitive dielectric material, such as any of the polymer materials mentioned above with reference to FIG. 2. The dielectric-protective material may be deposited onto the gas-sensitive dielectric material in any suitable manner known in the art. For instance, spin-coating may be used in case of polymers such as polyimide. If necessary, the spin-coated polymer layer may then be patterned for opening accesses to the underlying contact and/or layers. Polyimide may then be patterned.

Since the dielectric-protective materials described above are often used in capacitive gas sensors for providing other functions, the principles of the present invention may be easily integrated into existing manufacturing processes of integrated circuits, such as CMOS processes, without significant increase of costs or change of the respective manufacturing protocols. The use of a polyimide dielectric-protective layer in capacitive humidity sensors allows achieving the same RH sensitivity with less sensitivity to thermal processes, although the sensors may display a higher hysteresis and response time if the polyimide protective layer is too thick. If the polyimide protective layer is relatively thin, the impact on hysteresis and response time is very low.

According to an aspect of the present invention, the sensitivity of the capacitive gas sensor to reflow can also be significantly reduced or prevented by modifying the structure of the first electrode, the second electrode, and/or the gas-sensitive dielectric material in any of the gas sensor configurations described above, so as to minimize the mechanical stress applied by the first and/or second electrodes at the interface with the gas-sensitive dielectric material at temperatures close to a temperature at which the structure of the gas-sensitive dielectric material is softened.

For instance, in any of the electrode configurations described with reference to FIGS. 2 to 4, parameters of the top electrode, such as thickness and/or level of porosity, may be optimized so as to achieve a top electrode that displays minimal thermal dilation and consequently, minimum mechanical stress. For instance, the top electrode may be formed of a porous polymer doped with electrically conducting particles as described above, and having a thickness reduced to a critical thickness below the usual thickness of 10-30 µm at which the effects of thermal dilatation at reflow peak temperatures are significantly reduced, while still providing the necessary electrical continuity. The doping concentration of electrically conductive particles may be increased to compensate for the reduced thickness of the top electrode.

In addition, or alternatively, the degree of porosity of the porous polymer may be increased above levels commonly used in conventional porous electrodes so as to reach the optimal porosity at which the effects of thermal dilatation are less important at temperatures close to the glass temperature of the gas-sensitive dielectric material.

The principles of electrode optimization described above may also be applied to bottom electrodes in sensors with stacked electrode configuration, if required, or to interdigitated electrodes such as described with reference to FIGS. 5 to 6. The optimal thickness and/or degree of porosity of the gas sensor electrodes may be determined empirically depending on the characteristics of the capacitive gas sensor, namely, the materials used for the electrodes and/or gas sensitive dielectric, so as to find the thickness and/or level of porosity at which the thermal dilatation effects are minimized. The optimization of the electrode thickness and/or porosity may imply a change in the composition and/or manufacturing process. However, electrode optimization allows achieving a capacitor sensor design with less sensitivity to reflow processes while exhibiting the same RH sensitivity, hysteresis and response time, in comparison to capacitor sensor designs with the conventional electrode parameters.

In addition, or alternatively, the thermally-induced mechanical stress exerted by the sensor electrodes on the gas sensitive polymer dielectric may also be reduced or avoided by using an additived polymer material as the gas-sensitive dielectric material. The additived polymer material may be selected from an additived polymer grade, which originates from a base polymer that is doped with a cross-linking additive. The cross-linking additive has the function of pinning the chains of the base polymer so as to increase the resistance of the base polymer chains to a change of orientation under thermally-induced mechanical stress. The use of a cross-linking additived polymer has the advantage of reducing the gas sensor sensitivity to reflow processes, while achieving a similar RH sensitivity, same hysteresis and response time, in comparison with gas sensors using a same base polymer material but without cross-linking additive.

The capacitive gas sensor may be manufactured by techniques used in the semiconductor industry, the method comprising: providing the second electrode; forming the gas-sensitive dielectric material onto the second electrode; depositing a dielectric-protective material to cover an area of the gas-sensitive dielectric material; and depositing the first electrode onto said area covered by the dielectric-protective material.

The first electrode, the second electrode, and/or the gas-sensitive dielectric material are then designed to minimize the mechanical stress applied by the first and/or second electrode at the interface with the gas-sensitive dielectric material in that: a polymer material from an additived polymer grade is used to form the gas-sensitive dielectric material, the polymers of the additived polymer grade including a cross-linking additive adapted to pin the chains of the polymer material for increasing the resistance to a change of chain orientation under thermally-induced mechanical stress from the at least one of the first and second electrodes. In addition, or alternatively, at least one of the first and second electrodes are made of porous polymer materials doped with electrically conducting particles, a thickness and/or a degree of porosity of the porous polymer material being selected to reduce thermal dilatation of the respective electrode at temperatures close to a temperature at which the structure of the gas-sensitive dielectric material is softened.

The dielectric-protective material, the optimized electrode(s), and the polymer with cross-linking additive described above all address the same problem of preventing an increase of permittivity of the gas-sensitive polymer component, and therefore, can be advantageously implemented independently, or in any combination thereof, in any of the capacitive gas sensor configurations described above with reference to FIGS. 2 to 6, or other capacitive gas sensor designs, if applicable. For instance, the dielectric-protective layer may be omitted in case the optimized top electrode and/or cross-linking additive are used.

In conclusion, the present invention provides capacitive sensor designs for measurements of gas compound concentration in a medium, such as relative humidity, in which the gas sensitive component of the sensor is protected from or less affected by the effects of mechanical constraints at temperatures close to the glass temperature of the gas sensitive component, and therefore, having a response that is not affected by reflow soldering processes as well as high temperature storage (for e.g. from 80° C. to 250° C.). General thermal resistance is increased, allowing new applications at high temperatures.

Although certain features of the above exemplary embodiments were described using terms such as "top" and "bottom", these terms are used for the purpose of facilitating the description of the respective features and their relative orientation within the optical module only and should not be construed as limiting the claimed invention or any of its components to a particular spatial orientation. Further, the word "a" or "an" preceding an element does not exclude the presence of a plurality of such elements.

REFERENCE NUMERALS 100 conventional capacitive gas sensor
110 top electrode
120 bottom electrode
130 substrate
140 polymer dielectric layer
160 via
170 adhesion layer
200 capacitive gas sensor
210 first electrode, top electrode
220 second electrode, bottom electrode
230 substrate 240 gas sensitive dielectric layer
250 dielectric-protective material
300 integrated capacitive gas sensor
310 first electrode, top electrode
320 second electrode, bottom electrode
330 semiconductor circuit substrate
340 gas sensitive dielectric material
350 dielectric-protective material
360 via
370 adhesion layer
400 perforated capacitive gas sensor
410 first electrode, top electrode
420 second electrode, bottom electrode
440 gas sensitive dielectric material
450 dielectric-protective material
460 perforations
500 interdigitated capacitive gas sensor
510 first electrode, top electrode
510a-510c first electrode islands
515 conducting strip
520 second electrode, bottom electrode
520a-520b second electrode islands
525 conducting strip
530 substrate
540 gas sensitive dielectric material
550 dielectric-protective material

What is claimed is:

1. A capacitive humidity sensor comprising:
a first electrode;
a second electrode;
a humidity sensitive dielectric material arranged between the first and the second electrodes to form a humidity sensitive capacitor, the humidity sensitive dielectric material having a permittivity that depends on an amount of humidity absorbed from an environmental medium; and
a dielectric-electrode interfacing material arranged between the humidity sensitive dielectric material and at least one of the first and second electrodes, the dielectric-electrode interfacing material being permeable to the humidity and configured to absorb thermally-induced dilatation of the at least one of the first and second electrodes thereby reducing the mechanical stress applied on the humidity sensitive dielectric material.

2. The capacitive humidity sensor according to claim 1, wherein the humidity sensitive dielectric material comprises a humidity sensitive polymer.

3. The capacitive humidity sensor according to claim 1, wherein the humidity sensitive dielectric material comprises one or more layers of a sulfone-based polymer of a group comprising polysulfone, polyethersulfone and polyphenylsulfone, and any combination thereof.

4. The capacitive humidity sensor according to claim 1, wherein the humidity sensitive dielectric material is a sulfone-based polymer material.

5. The capacitive humidity sensor according to claim 1, wherein the humidity sensitive dielectric material comprises a polymer material from an additived polymer grade, the polymers of the additived polymer grade including a cross-linking additive adapted to pin the chains of the polymer material for increasing the resistance to a change of chain orientation under thermally-induced mechanical stress from the at least one of the first and second electrodes.

6. The capacitive humidity sensor according to claim 1, wherein at least one of the first and second electrodes have a porous structure adapted to pass through the humidity from the environmental medium to the humidity sensitive dielectric material.

7. The capacitive humidity sensor according to claim 6, wherein at least one of the first and second electrodes is made of a porous polymer material doped with electrically conducting particles.

8. The capacitive humidity sensor according to claim 1, wherein the first electrode is formed on a top side of the humidity sensitive dielectric material that absorbs the humidity from the environment, the second electrode is formed on a side of the humidity sensitive dielectric material opposed to the top side, and the dielectric-electrode interfacing material being interposed between the top side of the humidity sensitive dielectric material and the first electrode.

9. The humidity sensor according to claim 8, wherein the humidity sensor is integrated in a semiconductor circuit substrate, the second electrode is arranged directly on the semiconductor circuit substrate, and the first electrode is connected to a patch in the semiconductor circuit substrate through a via that passes across the dielectric-electrode interfacing material and the humidity-sensitive dielectric material.

10. The humidity sensor according to claim 8, wherein at least one of the first electrode, the dielectric-electrode interfacing material, and the humidity-sensitive dielectric material have a perforated structure comprising one or more perforations to facilitate absorption and/or adsorption of the humidity by the humidity-sensitive dielectric material.

11. The humidity sensor according to claim 1, wherein the first electrode comprises one or more first electrode islands electrically connected to each other to act as a single electrode, the second electrode is provided as one or more second electrode islands electrically connected to each other to act as a single electrode, the first electrode islands being intercalated with the second electrode islands to form an interdigitated electrode structure, the humidity-sensitive dielectric material lying in-between adjacent electrode islands, and the dielectric-electrode interfacing material being formed between the humidity-sensitive dielectric material and each electrode island.

12. The capacitive humidity sensor according to claim 1, wherein the dielectric-electrode interfacing material comprises a polymer having a glass temperature higher than the glass temperature of the humidity sensitive dielectric material.

13. The capacitive humidity sensor according to claim 1, wherein the humidity sensitive dielectric material comprises one or more layers of a polymer of a group comprising: cellulose acetate butyrate, polyamide-imide, polyetherimide, and polyamide, and/or any combinations thereof.

14. A capacitive humidity sensor comprising:
a first electrode;
a second electrode, wherein at least one of the first and second electrodes have a porous structure configured to enable passage of humidity therethrough from an environmental medium;
a humidity sensitive gas sensitive dielectric material arranged between the first and the second electrodes to receive the humidity and form a humidity gas sensitive capacitor; and
a dielectric-electrode interfacing material arranged between the humidity sensitive gas sensitive dielectric material and one of the first and second electrodes;
wherein the humidity sensitive gas sensitive dielectric material is a sulfone-based polymer material, wherein and the dielectric-electrode interfacing material is a polyimide material or any polymer material has having a glass temperature higher than the glass temperature of the humidity sensitive gas sensitive dielectric material and absorbs thermally-induced dilatation of the first or second electrode thereby reducing the mechanical stress applied on the humidity sensitive dielectric material, and wherein the dielectric-electrode interfacing material is permeable to the humidity being passed between one of the first or second electrodes and the humidity sensitive dielectric material.

15. The capacitive humidity sensor according to claim 14, wherein at least one of the first and second electrodes is made of a porous polymer material doped with electrically conducting particles, a thickness and/or a degree of porosity of the porous polymer material being selected to reduce thermal dilatation of the respective electrode at temperatures from 80° C. to 250° C. so as to reduce the mechanical stress applied on the humidity sensitive dielectric material.

\* \* \* \* \*